United States Patent [19]
Wrage

[11] Patent Number: 5,050,285
[45] Date of Patent: Sep. 24, 1991

[54] HYDRAULIC TOOL FOR DISASSEMBLY OF UNIVERSAL JOINTS

[76] Inventor: Brian L. Wrage, R.R. 1, Lincoln, Ill. 62656

[21] Appl. No.: 483,893

[22] Filed: Feb. 22, 1990

[51] Int. Cl.[5] .............................................. B23P 19/04
[52] U.S. Cl. ...................................................... 29/252
[58] Field of Search ......................... 29/252, 257, 266; 254/133, 134, 93 R, 30, 11, 35; 269/249

[56] References Cited

U.S. PATENT DOCUMENTS

| | | | |
|---|---|---|---|
| 2,548,944 | 4/1951 | Chapman | 254/133 R |
| 3,036,817 | 5/1962 | Morici | 254/134 |
| 3,429,021 | 2/1969 | Spiess | 29/251 |
| 4,558,502 | 12/1985 | Gossmann et al. | 29/252 |
| 4,870,739 | 10/1989 | Richards | 29/252 |

*Primary Examiner*—Robert C. Watson
*Attorney, Agent, or Firm*—Richard L. Miller

[57] ABSTRACT

A device for dismantling a universal joint is provided and consists of a C-shaped housing having a fork at lower end and an abutment at upper end to fit between a first arm of a first yoke member of the universal joint. A main piston extends vertically from the housing and has a bar transversely attached to its distal end. A hydraulic mechanism within the housing will force the main piston downwardly so that the transverse bar will bear against arms of a second yoke member of the universal joint to cause a cap from a second arm of the first yoke member to disengage from a cross shaft of the universal joint.

2 Claims, 1 Drawing Sheet

HYDRAULIC TOOL FOR DISASSEMBLY OF UNIVERSAL JOINTS

BACKGROUND OF THE INVENTION

The instant invention relates generally to tools and more specifically it relates to a device for dismantling a universal joint.

Numerous tools have been provided in the prior art that are adapted to effect the disassembly of vehicular-type universal joints. For example, U.S. Pat. Nos. 4,343,075 to Guptill et al.; 4,570,319 to Skoworodko; and 4,658,488 to Johnstead all are illustrative of such prior art. While these units may be suitable for the particular purpose to which they address, they would not be as suitable for the purpose of the present invention as hereafter described.

SUMMARY OF THE INVENTION

A primary object of the present invention is to provide a device for dismantling a universal joint that will overcome the shortcomings of the prior art devices.

Another object is to provide a device for dismantling a universal joint that will remove a universal joint from between a transmission and drive shaft by the operation of a hydraulic piston mechanism.

An additional object is to provide a device for dismantling a universal joint that will disassemble a universal joint quickly to save time and money for the labor.

A further object is to provide a device for dismantling a universal joint that is simple and easy to use.

A still further object is to provide a device for dismantling a universal joint that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
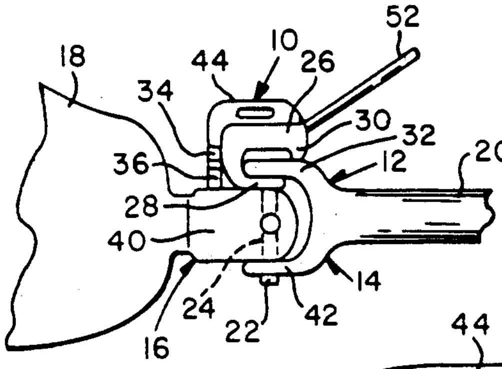
FIG. 1 is a diagrammatic side view of the instant invention in use removing a typical universal joint.
Figure 2:
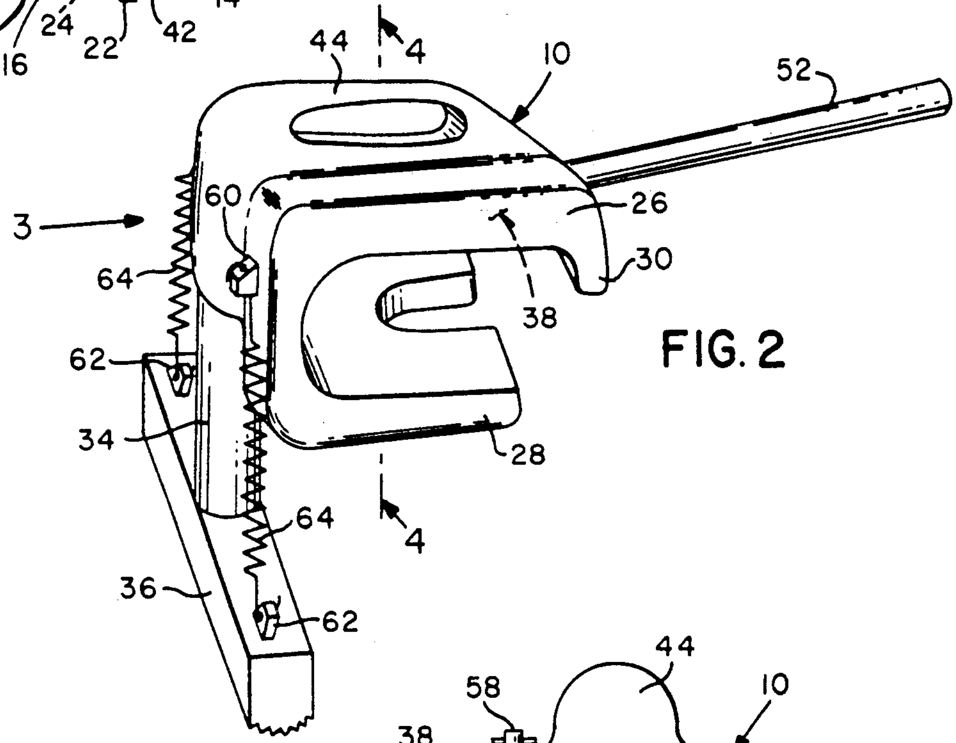
FIG. 2 is a diagrammatic perspective view of the instant invention per se.
Figure 4:
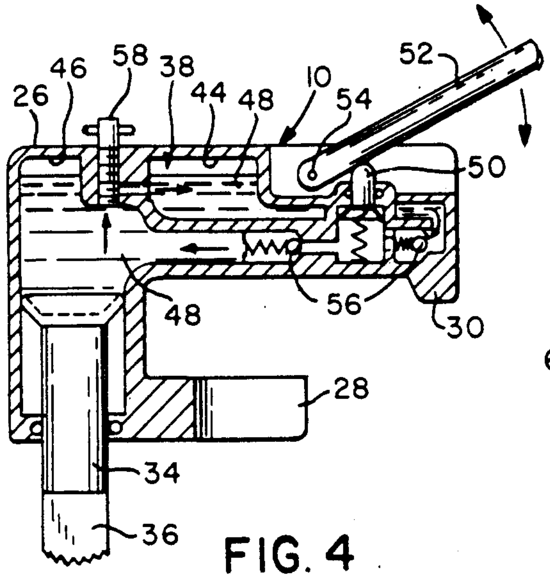
FIG. 4 is a diagrammatic cross sectional view taken along line 4—4 of FIG. 2 illustrating the internal mechanism within the instant invention.
Figure 3:
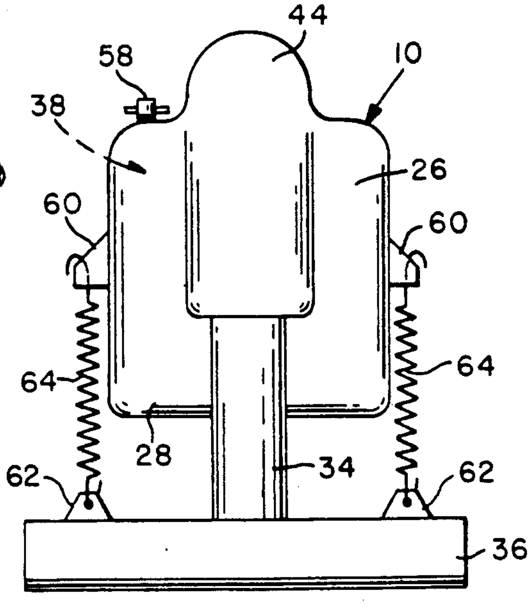
FIG. 3 is a diagrammatic rear view as indicated by arrow 3 in FIG. 2 thereof.

Turning now descriptively to the drawings, in which like reference characters denote like elements throughout the several views, FIG. 1 through 4 illustrates a device 10 for dismantling a universal joint 12 that includes first and second yoke members 14 and 16 between a transmission 18 and drive shaft 20 of a motor vehicle. Each yoke has a pair of opposed first and second arms which seat respective press fit caps 22. A cross shaft 24 cooperates with the caps 22 to mount the yoke members 14 and 16.

The device 10 consists of a generally C-shaped housing 26 having a fork 28 at lower end and an abutment 30 at upper end to typically fit between the first arm 32 of the first yoke member 14. A main piston 34 extends vertically from the housing 26 while a bar 36 is transversely attached to distal end of the main piston 34. A hydraulic mechanism 38 is within the housing 26 for forcing the main piston 34 downwardly so that the transverse bar 36 will bear against the arms 40 of the second yoke member 16 to cause the cap 22 from the second arm 42 of the first yoke member 14 to disengage therefrom. A handle 44 is formed on the top of the housing 26 so that the device 10 can be carried and positioned by the user of the device.

The hydraulic mechanism 38 includes a pair of reservoirs 44 and 46 carried within the housing 26 for holding hydraulic fluid 48. A pump piston 50 is positioned between the reservoirs 44 and 46 while a pump handle 52 is pivotally mounted at one end 54 on the housing 26 to activate the pump piston 50. A pair of check valves 56 are each positioned on opposite sides of the pump piston 50 so that when the pump handle 52 is operated activating the pump piston 50 the check valves 56 will cause the hydraulic fluid 48 to flow from the first reservoir 44 into the second reservoir 46 forcing the main piston 34 downward.

A screw release valve 58 is in the housing 26 between the reservoirs 44 and 46 so that when the screw release valve 58 is opened the hydraulic fluid 48 will flow from the second reservoir 46 back into the first reservoir 44. A first set of ears 60 are each mounted on opposite sides of the housing 26, while a second set of ears 62 are each mounted on opposite top sides of the transverse bar 36. Springs 64 are mounted between each of the ears 60 and 62 so that when the screw release valve 58 is opened the springs 64 will cause the return the main piston 34 back up to its original non-operative position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A device for dismantling a universal joint which has first and second yoke members between a transmission and drive shaft of a motor vehicle, each yoke member having a pair of opposed first and second arms which seat respective press fit caps and a cross shaft cooperating with the caps to mount the yoke members, said device comprising:

(a) a generally C-shaped housing having a fork at lower end and an abutment at upper end so as to fit between the first arm of the first yoke member;

(b) a main piston extending vertically from said housing;

(c) a bar transversely attached to distal end of said main piston;

(d) hydraulic means within said housing for forcing said main piston downwardly so that said transverse bar will bear against the arms of the second yoke member to cause the cap from the second arm of the first yoke member to disengage therefrom, wherein said housing further includes a handle formed on the top so that said device can be carried and positioned by user of said device;

(e) a pair of reservoirs carried within said housing for holding a hydraulic fluid;

(f) a pump piston positioned between said reservoirs;

(g) a pump handle pivotally mounted at one end on said housing to activate said pump piston; and (h) a pair of check valves positioned on opposite sides of said pump piston so that when said pump handle is operated activating said pump piston whereby said check valves will cause the hydraulic fluid to flow from said first reservoir into said second reservoir forcing said main piston downward.

2. A device as recited in claim 1, further including:

(a) a screw release valve in said housing between said reservoirs so that when said screw release valve is opened the hydraulic fluid will flow from said second reservoir back into said first reservoir;

(b) a first pair of ears, one mounted on side of said housing and a second pair of ears mounted on top of said transverse bar; and (c) a spring means mounted between said first pair of ears and said second pair of ears so that when said screw release valve is opened said spring means will cause the return of said main piston back up to its original with drawn non-operative position.

* * * * *